United States Patent [19]
Hunt

[11] 3,956,445
[45] May 11, 1976

[54] PELLETING OF CARBON BLACK
[75] Inventor: Harold R. Hunt, Bartlesville, Okla.
[73] Assignee: Phillips Petroleum Company, Bartlesville, Okla.
[22] Filed: Aug. 21, 1974
[21] Appl. No.: 499,148

[52] U.S. Cl. ................................................. 264/117
[51] Int. Cl.² ........................................... B01J 2/12
[58] Field of Search .................................. 264/117

[56] References Cited
UNITED STATES PATENTS 2,457,963   1/1949   Thodos ............................ 264/117
3,333,038   7/1967   Walenciak ....................... 264/117

Primary Examiner—Robert F. White
Assistant Examiner—J. R. Hall

[57] ABSTRACT

Carbon black is pelleted by combining loose carbon black with an aqueous pelleting liquid and agitating the mixture. Additional loose carbon black is added in a series of increments, followed by additional aqueous pelleting liquid. The process produces layered pellets.

8 Claims, 1 Drawing Figure

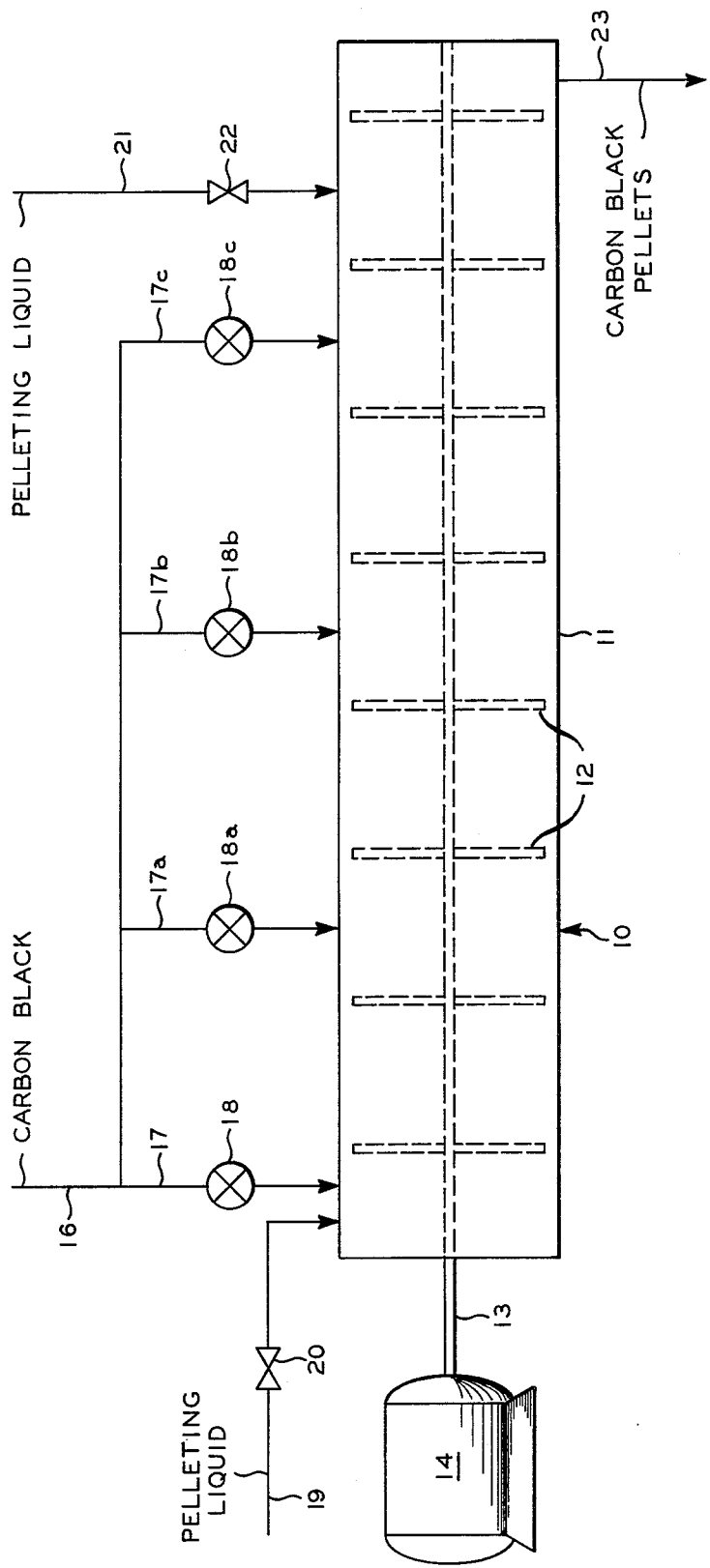

PELLETING OF CARBON BLACK

It is common practice in the carbon black industry to form loose carbon black into pellets. This increases the density of the black and provides a product which can be handled and transported more readily. One well known procedure for producing carbon black pellets involves combining loose carbon black and an aqueous pelleting liquid in a pellet mill which contains a series of rotating pins.

In accordance with this invention, an improved carbon black pelleting method is provided which produces layered pellets of relatively high density. An aqueous pelleting liquid and loose carbon black are combined in a weight ratio of about 2/3 to 2. The resulting mixture is then agitated, such as in a pellet mill, to form pellets. Additional carbon black is added in a series of increments, and additional water is finally added. By controlling relative amounts of carbon black and pelleting liquid and the time of addition of the increments of carbon black, improved layered pellets are formed. Layered pellets are often preferred because they are easier to compound into rubber. The pellets produced by this invenion also have a good size distribution.

The accompanying drawing is a schematic representation of apparatus which can be employed to carry out the process of this invention.

Referring now to the drawing in detail, there is shown a pellet mill 10 which comprises a cylindrical shell 11 having pellet agitating means disposed therein. The pellet agitating means can comprise a series of pins 12 which are mounted on a rotatable shaft 13. Shaft 13 is driven by a motor 14. Pellet mills of this type are well known in the art and are described in U.S. Pat. No. 3,674,437, for example.

Loose carbon black to be pelleted is introduced through a conduit 16. A conduit 17, which has a flow control means such as a star valve 18 therein, extends between conduit 16 and the inlet end of pellet mill 10. Additional conduits 17a, 17b and 17c, having respective star valves 18a, 18b and 18c therein, extend between conduit 16 and the pellet mill at locations spaced between the inlet and the outlet ends. A pelleting liquid, such as water, is introduced into the inlet end of the pellet mill through a conduit 19 which has a control valve 20 therein. Additional pelleting liquid is introduced at a region near the outlet of the pellet mill through a conduit 21 which has a control valve 22 therein. Carbon black pellets are removed from the outlet end of the mill through a conduit 23 and passed to conventional drying equipment.

In accordance with this invention, aqueous pelleting liquid and carbon black are introduced through respective conduits 19 and 17 in a weight ratio of liquid to black of about 2:3 to 2:1. Additional carbon black is introduced through conduits 17a, 17b and 17c. These conduits are spaced with respect to one another so that the average residence time of the carbon black pellets moving through the mill is at least 1 minute between adjacent inlet conduits. The amount of loose carbon black added through conduits 17a, 17b and 17c is such that each incremental addition comprises about 10 to 50 percent by weight of the carbon black added through conduit 17 per unit time and the total amount of carbon black added in such incremental additions is in the range of about 50 to 150, preferably 75 to 125, percent by weight of the black added through conduit 17 per unit time. In addition, the amount of carbon black added through the downstream conduits 17a, 17b and 17c is such that the pellets within the mill have an average moisture content of at least 30 percent by weight at all times. This moisture content can readily be determined by withdrawing samples of the pellets from selective locations and measuring the moisture content.

The aqueous pelleting liquid added through conduit 21 is in an amount within the range of about 5 to 50 percent by weight of the pelleting liquid added through conduit 19 per unit time. Conduit 21 should be located upstream from the end of the pelleter a sufficient distance that some agitation of the pellets occurs between this introductory point and outlet conduit 23.

While the invention has been shown in conjunction with a conventional continuous pellet mill and the relative addition rates are specified in terms of unit time, the invention can also be practiced in a batch mill with incremental addition of the carbon black and water in the ratios as set forth above. In this case, the average residence times refer to the times between additions of black.

A number of runs were carried out to demonstrate the pelleting process of this invention and to show the superiority of this process over other pelleting procedures. In a first series of runs (Runs 1 to 6), Type N-330 carbon black was pelleted in an 8-inch batch pellet mill provided with a series of pins. In Run 1, the pins in the mill were rotated at a speed of 420 revolutions per minute. Two pounds of carbon black and four pounds of water were introduced initially into the mill. After 5 minutes mixing time, four one-pound increments of carbon black were added at 5-minute intervals. A total mixing time of 30 minutes was employed.

In Run No. 2, 2 pounds of water was added to the product of Run No. 1 and mixed together for a short period of time. In Run No. 3, the pins were rotated at a speed of 690 revolutions per minute. 2 pounds carbon black and 4 pounds water were introduced initially and mixed for 5 minutes. 4 one-pound increments of carbon black were then added at 5-minute intervals. After an additional 5 minutes of mixing, 2 pounds water was added and the pellets were mixed for 10 minutes. 2 one-pound increments of carbon black were added at 5-minute intervals, followed by 2 ½-pound increments of water at 5-minute intervals.

In Run No. 4, 3 pounds carbon black and 4 pounds water were added initially, and the pelleter was operated at a speed of 690 revolutions per minute. 3 one-pound increments of carbon black were added at 5-minute intervals, followed by 3 ¼-pound increments of water. The total mixing time was 30 minutes. Run No. 5 was conducted in the same manner as Run No. 4 through the addition of the 3 one-pound increments of carbon black. Three-fourths pound water was then added and mixed for 10 minutes.

In Run No. 6, 3 pounds carbon black and 1.5 pounds water were introduced into the pellet mill operated at a speed of 420 revolutions per minute. After 30 minutes, 3 additional pounds of carbon black were added. After an additional 30 minutes, 1.5 pounds of water was added. The mill was then run an additional 30 minutes.

In a second series of runs (Runs 7 to 9), carbon black Type N-110 was pelleted. In Run No. 7, 4 pounds black and 6 pounds water were mixed for 30 minutes. 5 one-pound increments of black were added at 20-minute intervals. The mixer was operated at a speed of 420 revolutions per minute, with a total mixing time of 3 hours.

In Run No. 8, 4 pounds of black and 6 pounds of water were introduced together and mixed for 30 minutes.

In Run No. 9, 3 pounds black and 4.5 pounds water were introduced and mixed for 5 minutes. 3 one-pound increments of carbon black were added at 5-minute intervals. Water was added in ¼-pound increments, with the minimum mixing time between increments necessary to produce pellets. The total amount of water introduced was 5.5 pounds. The total mixing time was 40 minutes at a mixer speed of 690 revolutions per minute. In all runs, the pellets were thereafter dried.

The following results were obtained:

|  | Run No. | | | | | | | | |
|---|---|---|---|---|---|---|---|---|---|
|  | 1 | 2 | 3 | 4 | 5 | 6 | 7 | 8 | 9 |
| Bulk Density[a] | 25.3 | 25.6 | 30.9 | 27.6 | 29.7 | — | 24.0 | 20.9 | 25.3 |
| Hardness[b] | 83.2 | 82.1 | 111.7 | 99.6 | 75.6 | — | 87 | 80 | 87 |
| Screen[c] No. 10 | 49.6 | 60.1 | 72.5 | 0.9 | 1.1 | — | 0.1 | 0.5 | 0.2 |
| No. 16 | 30.2 | 24.9 | 24.8 | 61.1 | 5.9 | — | — | — | — |
| No. 18 | 4.3 | 3.3 | 1.4 | 17.9 | 8.7 | — | 1.0 | 3.9 | 2.0 |
| No. 30 | 6.1 | 4.5 | 1.2 | 14.1 | 49.8 | — | — | — | — |
| No. 35 | — | — | — | — | — | — | 57.8 | 57.9 | 18.6 |
| No. 60 | 3.5 | 4.4 | 0.3 | 3.9 | 33.4 | — | 31.7 | 33.2 | 38.2 |
| No. 120 | 1.8 | 1.8 | 0 | 2.1 | 1.4 | — | 8.1 | 4.4 | 33.1 |
| Pan | 4.5 | 1.3 | 0 | 0.5 | 0.1 | — | 1.3 | 0.2 | 7.9 |

[a]ASTM D-1513-60 (pounds/cubic foot).
[b]A relative hardness test on 16 to 18 mesh pellets; a higher number indicates a greater force required to crush the pellets.
[c]ASTM D-1511-60 (using ASTM E-11 screens).
Run No. 1 — some loose black remained on walls of pelleter.
Run No. 2 — some of the larger pellets broke on drying.
Run No. 3 — large balls formed after 40 minutes.
Run No. 4 — layered pellets were formed which were stable on drying.
Run No. 5 — same as No. 4.
Run No. 6 — no significant number of pellets formed.
Run No. 7 — pellets had some layering, but no definite outer shell.
Run No. 8 — pellets showed little if any layering.
Run No. 9 — pellets had definite outer shell.

Runs 4, 5 and 9 are representative of this invention. Run 6 represented an attempt to duplicate the process of U.S. Pat. No. 2,550,802. The runs of this invention produced layered or laminated pellets of relatively high bulk density and hardness (except Run No. 5 which may have been erroneously measured). In these runs, layering was determined visually under a microscope by use of a sharp pin to break a pellet. Layering was not measured in Runs 1 to 3 because the operation was not satisfactory.

While this invention has been described in conjunction with presently preferred embodiments, it obviously is not limited thereto.

What is claimed is:

1. The method of pelleting carbon black which comprises:
   a. introducing an aqueous pelleting liquid and loose carbon black in the weight ratio of about 2:3 to 2:1 into one end of an elongated continuous pellet mill having rotating agitating means therein which extend between the opposite ends of the pellet mill;
   b. rotating said agitating means to mix said liquid and carbon black to form pellets and to move said pellets toward the end of said pellet mill opposite said one end;
   c. introducing additional loose carbon black into said pellet mill through a plurality of conduit means spaced along the length of said pellet mill such that the average residence time of pellets in the mill between said one end and the first conduit means and between adjacent conduit means is at least one minute, the amount of carbon black added through each of said conduit means being about 10 to 50 percent by weight of the carbon black introduced into said one end of the mill and the total amount of carbon black added through said conduit means being in the range of about 50 percent to 150 percent by weight of the carbon black added at said one end, and the total amount of carbon black added through said conduit means being such that the resulting pellets have a moisture content of at least about 30 percent by weight;
   d. introducing additional aqueous pelleting liquid into said pellet mill between the last conduit means and the second end of the pellet mill, the amount of additional liquid so added being in the range of about 5 to 50 percent by weight of the amount of liquid introduced into said one end of the mill, the location at which said additional liquid is added being spaced from the second end of said pellet mill so that agitation is imparted to the pellets after the additional liquid is added; and
   e. removing pellets from said second end of said pellet mill.

2. The method of claim 1 wherein said pelleting liquid is water.

3. The method of claim 1 wherein the total amount of carbon black added through said conduit means is in the range of about 75 percent to 125 percent by weight of the carbon black added at said one end.

4. The method of pelleting carbon black which comprises:
   a. combining an aqueous pelleting liquid and loose carbon black in the weight ratio of about 2:3 to 2:1, and agitating the mixture in a batch mill to form pellets;
   b. adding additional loose carbon black to the material resulting from step (a) in a series of increments and agitating the resulting mixture to continue to form pellets, there being a time interval of at least 1 minute between additions, the amount of carbon black added in each increment being about 10 to 50% by weight of the carbon black initially combined with the pelleting liquid, the total amount of carbon black added in said increments being in the range of about 50 to 150% by weight of the carbon black initially combined with pelleting liquid, and the total amount of carbon black added in said increments being such that the resulting pellets have a moisture content of at least about 30% by weight; and c. adding additional aqueous pelleting liquid to the material resulting from step (b) in an amount in the range of about 5 to 50% by weight of the amount of pelleting liquid initially combined with the carbon black, and agitating the resulting mixture to continue to form pellets.

5. The method of claim 4 wherein said pelleting liquid is water.

6. The method of claim 4 wherein water and carbon black are combined initially in a weight ratio of about 4:3; three increments of carbon black are subsequently added, each being about ⅛ by weight of the carbon black initially combined; and the final amount of water added being about 3/16 by weight of the water initially combined.

7. The method of claim 4 wherein water and carbon black are combined initially in a weight ratio of about 4.5:3; three increments of carbon black are subsequently added, each being about ⅛ by weight of the carbon black initially combined; and the final amount of water added being about 2/9 by weight of the water initially combined.

8. The method of claim 7 wherein the total amount of black added in said increments is in the range of about 75% to 125% by weight of the black initially combined.

* * * * *